(12) United States Patent
Kitada et al.

(10) Patent No.: US 8,515,067 B2
(45) Date of Patent: Aug. 20, 2013

(54) ACCOUNT AGGREGATION SYSTEM, INFORMATION PROCESSING APPARATUS AND ENCRYPTION KEY MANAGEMENT METHOD OF THE ACCOUNT AGGREGATION SYSTEM

(75) Inventors: Noriaki Kitada, Tokorozawa (JP); Kenichi Taniuchi, Fuchu (JP); Hiroyuki Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 342 days.

(21) Appl. No.: 12/954,428

(22) Filed: Nov. 24, 2010

(65) Prior Publication Data

US 2011/0150221 A1 Jun. 23, 2011

(30) Foreign Application Priority Data

Dec. 18, 2009 (JP) ................................. 2009-288318

(51) Int. Cl.
*H04L 29/06* (2006.01)

(52) U.S. Cl.
USPC ........................................................ 380/255

(58) Field of Classification Search
USPC ........................................................ 380/255
See application file for complete search history.

(56) References Cited

U.S. PATENT DOCUMENTS 5,892,828 A * 4/1999 Perlman ........................ 713/183
7,120,928 B2 * 10/2006 Sheth et al. ....................... 726/4
7,673,327 B1 * 3/2010 Polis et al. ......................... 726/5
2002/0133706 A1 * 9/2002 Khanna et al. ................ 713/182
2004/0205348 A1 * 10/2004 Watanabe et al. ............. 713/182

FOREIGN PATENT DOCUMENTS

| JP | 2000-259566 A | 9/2000 |
| JP | 2003-223565 A | 8/2003 |
| JP | 2008-160485 A | 7/2008 |
| JP | 2009-177368 A | 8/2009 |

OTHER PUBLICATIONS

Notification of Reasons for Rejection mailed by Japan Patent Office on Feb. 8, 2011 in the corresponding to Japanese patent application No. 2009-288318.

* cited by examiner

*Primary Examiner* — Michael S McNally
(74) *Attorney, Agent, or Firm* — Knobbe, Martens, Olson & Bear LLP

(57) ABSTRACT

According to one embodiment, an account aggregation system includes an information processing apparatus and an account aggregation server. The information processing apparatus includes a database, an automatic sign-on process module and an encryption key processing module. The automatic sign-on process module is configured to provide authentication data the service providing servers have requested for, by using the authentication data stored in the database. The encryption key processing module is configured to register, for the account aggregation server, an encryption key for encrypting authentication data to be stored in the database or for decrypting the authentication data stored in the database, to acquire the encryption key from the account aggregation server when a process is performed by using the encryption key, and to erase the encryption key after the process is performed. The account aggregation server includes an encryption key management module which is configured to manage the encryption key.

6 Claims, 4 Drawing Sheets

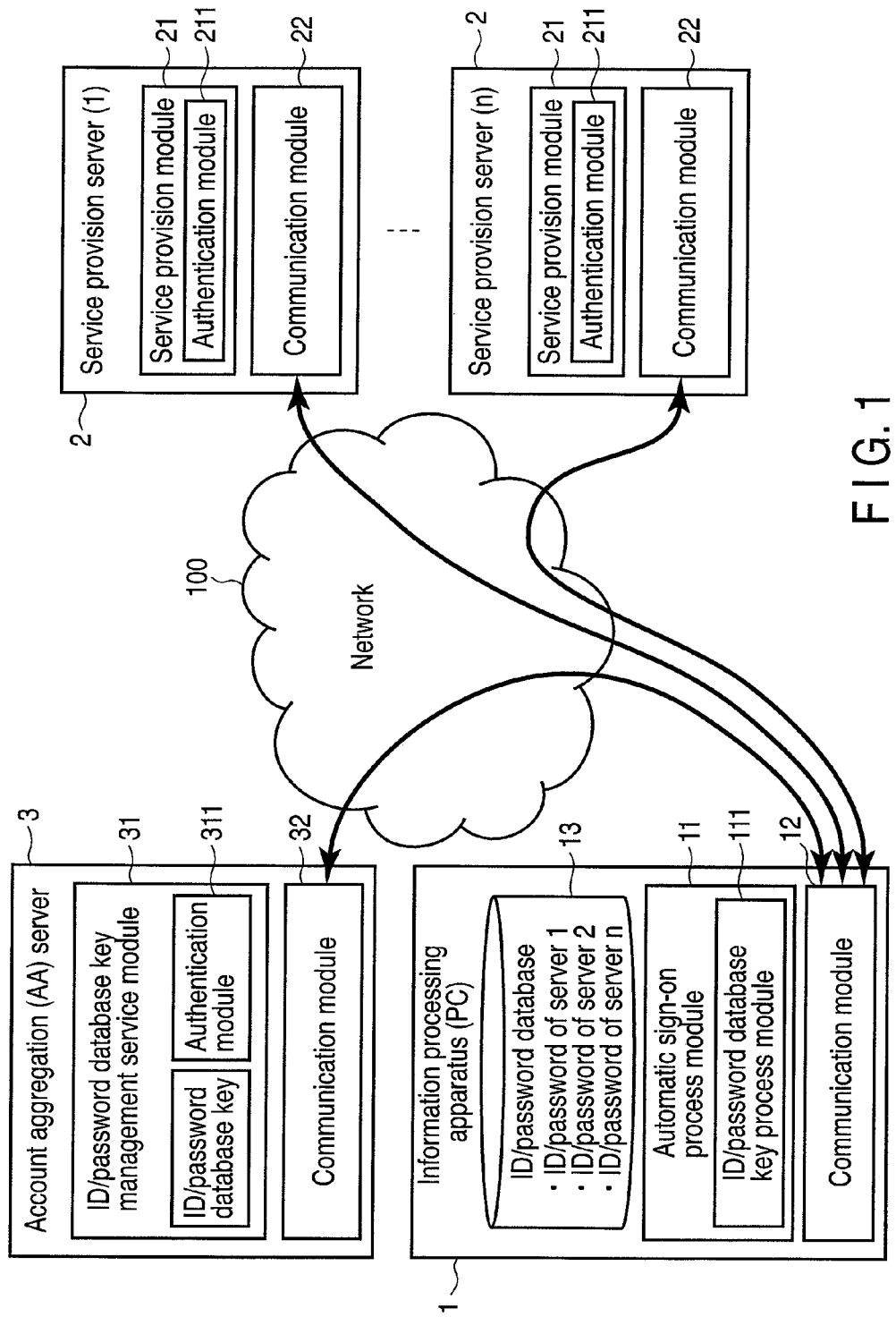
F I G. 1

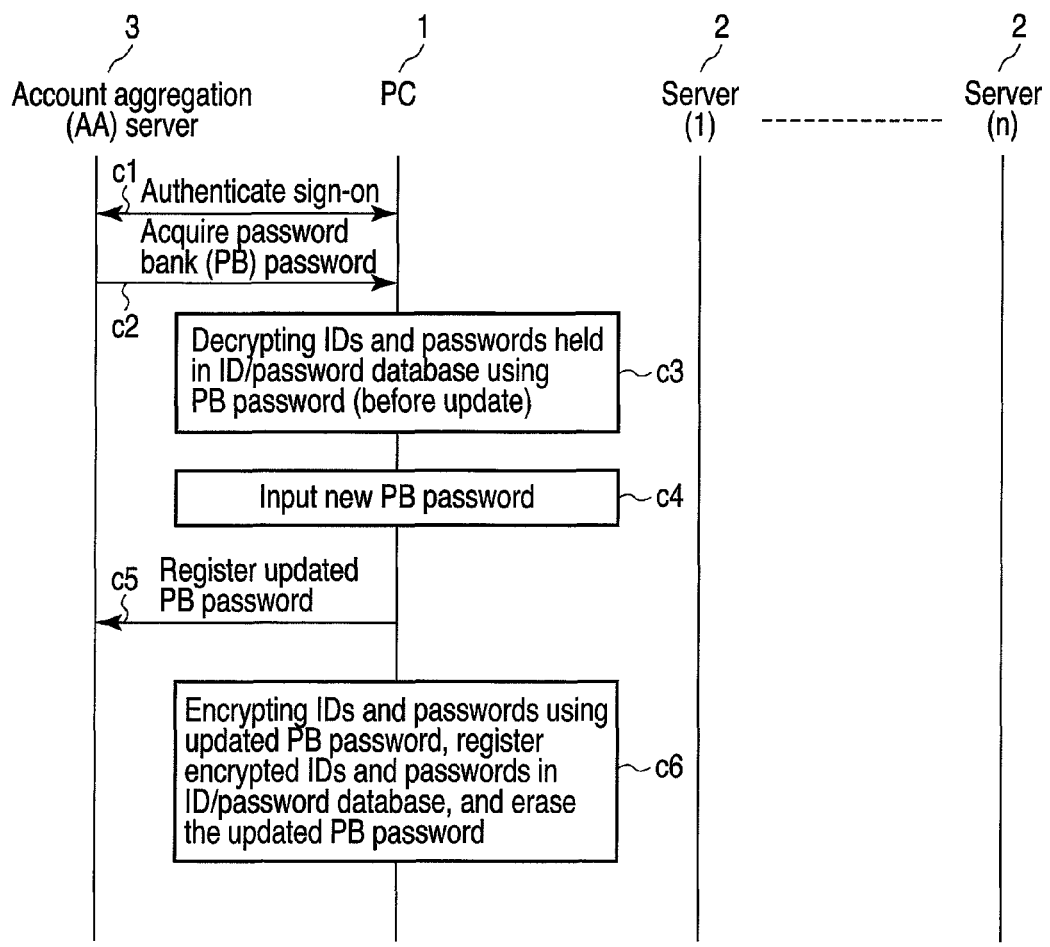
F I G. 4

ACCOUNT AGGREGATION SYSTEM, INFORMATION PROCESSING APPARATUS AND ENCRYPTION KEY MANAGEMENT METHOD OF THE ACCOUNT AGGREGATION SYSTEM

CROSS-REFERENCE TO RELATED APPLICATIONS

This application is based upon and claims the benefit of priority from Japanese Patent Application No. 2009-288318, filed Dec. 18, 2009; the entire contents of which are incorporated herein by reference.

FIELD

Embodiments described herein relate generally to an encryption key management technique configured to ensure the security in managing user IDs and passwords for logging in (or signing on) a plurality of servers, for example.

BACKGROUND

In recent years, commercial transactions have come to be practically performed via the Internet, not only between companies, but also between companies and consumers (users). In most cases, an electronic transaction, known as a "business-to-consumer (B-to-C) transaction," is achieved when a user uses a personal computer, logging in to the server of the company that provides various kinds of service. More specifically, the browser operating on the user's personal computer displays the Web page the company's server publishes on the Internet. The user then inputs his or her ID and password on the Web page, transmitting the ID or password to the server. The ID and password are thereby logged in the company's server.

Most users who utilize electronic transactions of this type receive service from a plurality of companies. For security reasons, some users have log-in user IDs and log-in passwords associated with the respective servers, each being an alphanumeric character string, and use the log-in user ID and log-in password associated with any server from which to receive service. The more user IDs and passwords a user has, the more he or she will be annoyed in managing them. To eliminate such a problem the users may have, a service called "account aggregation" is offered (see, for example, Jpn. Pat. Appln. KOKAI Publication No. 2000-259566.)

Using account aggregation, a user can log into the servers of a plurality of companies, only by inputting the user ID and password for logging in the server that provides the account aggregation service, only if the user IDs and passwords for logging the servers of the companies have been registered in the server that provides the account aggregation service. (Single-sign on is thereby accomplished.) Thus, the user is freed from the troublesome management of many user IDs and passwords.

From the user's point of view, however, the account aggregation service manages all his or her user IDs and passwords in an external server. The security all depends on external management. Although his or her ID and password have been encrypted and managed in the external server, they are decrypted in the external server when the external server logs in, in place of the user, the server with which the user wants to make a transaction. In the external server, the user ID and password temporarily remain decrypted. Although the time they remain decrypted is very short, they cannot be said never to leak outside the external server.

Software has been developed, which accomplish account aggregation in the user's personal computer. If this software is used, the user's IDs and passwords are all managed in the personal computer. Hence, there is no risk of leakage when the IDs and passwords are decrypted at the time of logging in the desired server. Thus, the security can be achieved.

If the personal computer is stolen, however, the user ID and password may leak if the software (namely, the personal computer) holds the encryption key for encrypting and decrypting the user ID and password.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary function block diagram showing the configuration of an account aggregation system according to an embodiment.

FIG. 4 is an exemplary diagram illustrating the communication sequence performed to update the password bank in the account aggregation system according to the embodiment.

DETAILED DESCRIPTION

Figure 2:
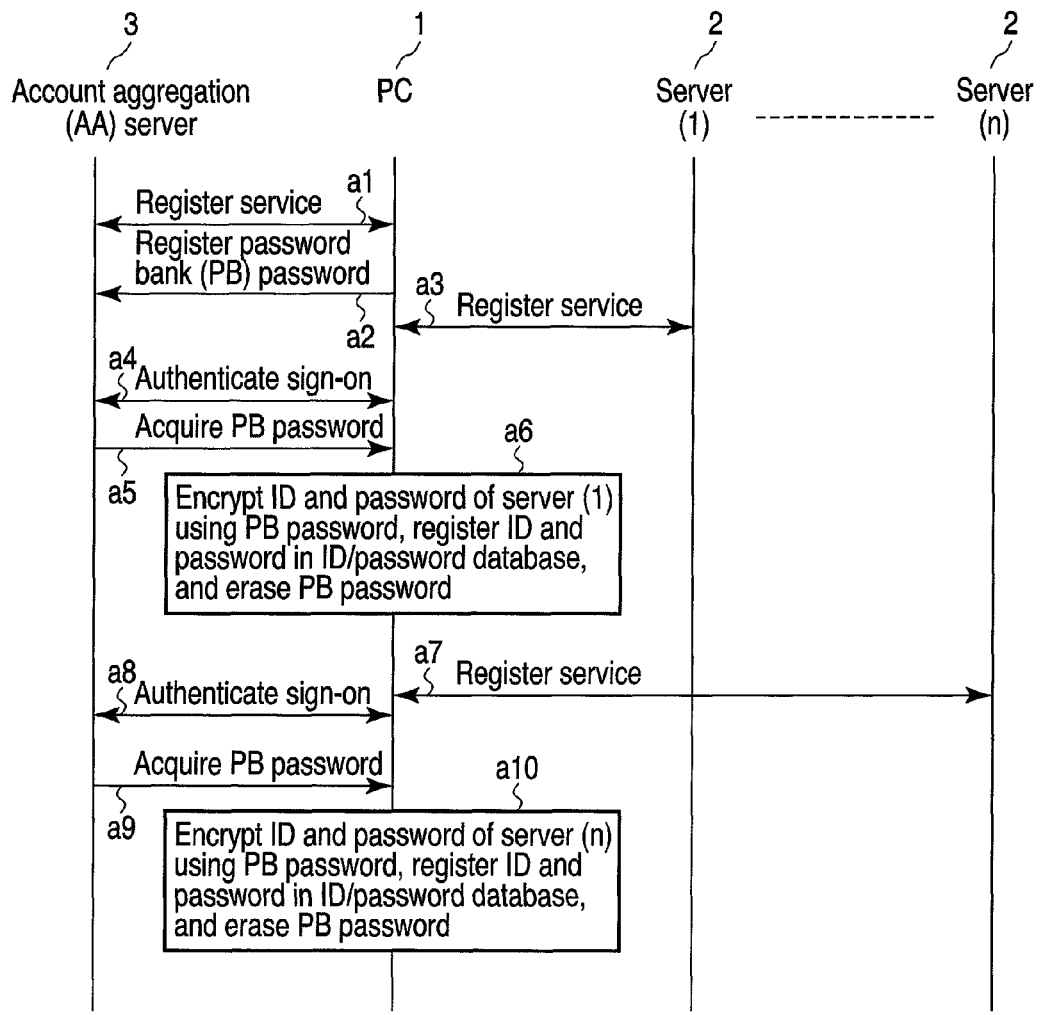
FIG. 2 is an exemplary diagram illustrating the communication sequence performed when the account aggregation system according to the embodiment is initialized.

Various embodiments will be described hereinafter with reference to the accompanying drawings.

In general, according to one embodiment, an account aggregation system includes an information processing apparatus and an account aggregation server. The information processing apparatus includes a database, an automatic sign-on process module, and an encryption key processing module. The automatic sign-on process module is configured to provide authentication data the service providing servers have requested for, by using authentication data stored in the database. The encryption key processing module is configured to register, for the account aggregation server, an encryption key for encrypting authentication data to be stored in the database or for decrypting the authentication data stored in the database, to acquire the encryption key from the account aggregation server when a process is performed by using the encryption key, and to erase the encryption key after the process is performed. The account aggregation server includes an encryption key management module which is configured to manage the encryption key.

FIG. 1 is an exemplary function block diagram showing the configuration of an account aggregation system according to an embodiment.

As shown in FIG. 1, the information processing apparatus 1 is, for example, a personal computer (PC) 1, such as a notebook type PC the user may use. The PC 1 includes a communication module 12 configured to achieve communication with another computer through a network 100 such as the Internet. A user may use the PC 1 to receive various kinds of service from various servers 2 (i.e., servers 1 to n).

Each of the servers 2 includes a service provision module 21 and a communication module 22. The service provision module 21 performs various processes to provide service to the user. The communication module 22 is configured to perform communication with any other computer via the network 100. The service provision module 21 includes an authentication module 211 configured to perform an authentication process of authenticating the user, allowing him or her to receive service.

The authentication module 211 requests that the user who wants to receive service should input his user ID identifying him and a password for confirming the user. The communication between the PC 1 and the server 2 is performed such that the PC 1 performs the function of a Web browser, whereas the server 2 the function of a Web server. An encrypted communication method based on, for example, Hypertext Transfer Protocol over Secure Transport Layer (HTTPS) is here employed. Hence, this encrypted communication ensures the security for all data conveyed on the network existing between the PC 1 and the server 2, including the user ID and the password.

Assume that for the data security, the user has different user IDs and different passwords, each being alphanumeric character string and associated with one server, so that he or she may be identified and may therefore receive various kinds of service from a plurality of servers 2. That is, the user has a plurality of user IDs and a plurality of passwords.

The PC 1 further includes an automatic sign-on process module 11. This module 11 is a module configured to free the user from the troublesome management of many user IDs and many passwords. The automatic sign-on process module 11 is constituted in the PC 1 when the password bank management software is first downloaded from an account aggregation server 3 connected to the PC 1 by the network 100 and then installed in the PC 1. The automatic sign-on process module 11 includes a user interface function that enables the user to inputs user IDs and passwords.

Once the password bank management software has been installed in the PC 1, an ID/password database (DB) 13 is constituted in the PC 1, more precisely in, for example, the hard disk drive (HDD) incorporated in the PC 1. The automatic sign-on process module 11 manages the user IDs and passwords associated with the respective servers 2, in the ID/password database 13. Using the user IDs and passwords stored in the ID/password database 13, the automatic sign-on process module 11 performs, for the user, log-in to any server 2 the user designates. Now that the ID/password database 13 has been so constituted in, for example, the HDD incorporated in the PC 1, there is no risk of leakage of user IDs or passwords, unlike in the case where the user IDs and passwords are managed in an external server.

The automatic sign-on process module 11 ensures security for the user IDs and passwords stored in the ID/password database 13, by encrypting these user IDs and passwords. In this account aggregation system, the PC 1 and the account aggregation server 3 connected to the PC 1 by the network 100 cooperate with each other, reliably accomplish data security by encrypting the user IDs and passwords managed in the ID/password database 13. More specifically, they cooperate to provide a system that can reliably prevent the leakage of the encryption key for encrypting and decrypting the user IDs and passwords, as will be explained below in detail.

As shown in FIG. 1, the account aggregation server 3 includes an ID/password database key management service module 31 and a communication module 32. The communication module 32 is configured to perform communication with any other computer via the network 100.

The ID/password database key management service module 31 is a module that provides service of managing the encryption key (ID/password database key) for encrypting and decrypting any user ID and any password stored in the ID/password database 13 that is provided in the PC 1. The ID/password database key management service module 31 includes an authentication module 311 configured to perform an authentication process of authenticating the user to whom the service should be provided.

In this embodiment, the authentication module 311 is configured to request the user to input the user ID and the password to identify him or her. The communication between the PC 1 and the account aggregation server 3, more precisely the communication between the automatic sign-on process module 11 and the ID/password database key management service module 31, is achieved as the PC 1 and the account aggregation server 3 function as a Web browser and a Web server, respectively. An encrypted communication method based on, for example, HTTPS is employed here. Therefore, as in the above-described communication between the PC 1 and the server 2, security is ensured for all data including the user IDs and passwords transferred on the network connecting the PC 1 and the account aggregation server 3. That is, the automatic sign-on process module 11 includes an encryption/decryption function.

The automatic sign-on process module 11, which uses the ID/password database 13 and performing log-in to the server 2, includes an ID/password database key process module 111. The ID/password database key process module 111 cooperates with the ID/password database key management service module 31 of the account aggregation server 3, appropriately handling an ID/password database key. The operating principle of the account aggregation system will be explained below, with reference FIG. 2, FIG. 3 and FIG. 4, as well as FIG. 1.

FIG. 2 is an exemplary diagram illustrating the communication sequence performed when the account aggregation system is initialized.

When the user (using the PC 1) accesses the account aggregation server 3 and then register him as a user in the account aggregation server 3 ("a1" in FIG. 2), the password bank management software is downloaded from the account aggregation server 3 to the PC 1 and installed in the PC 1. Next, the user registers a password band password on the setting menu screen of the account aggregation server 3 ("a2" in FIG. 2). The password bank password is used as the encryption key (i.e., ID/password database key) for encrypting and decrypting the user ID and the password, both managed in the ID/password database 13. In the communication, the data is encrypted by an encrypted communication method such as HTTPS as described above. Therefore, any password bank password can be input to the account aggregation server 3, without being eavesdropped. The input password bank password is held in the account aggregation server 3. In other words, the password bank password is not held in the PC 1.

Thereafter, user may access the server (1) 2 and register himself as first user ("a3" in FIG. 2) and may thereby acquire a user ID and a password. In this case, the user performs sign-on to the account aggregation server 3 ("a4" in FIG. 2), downloading the password bank password ("a5" in FIG. 2). Then, the PC 1 uses the password bank password thus downloaded, encrypting the user ID and the password, both for the server (1) 2. The user ID and the password, thus encrypted, are registered in the ID/password database 13. When the user ID and the password are registered in the ID/password database 13, the downloaded password bank password is immediately erased from the PC 1 ("a6" in FIG. 2).

Further, the user may access another server 2 (for example, server (n) 2) and register him or her ("a7" in FIG. 2), and may thereby acquire a user ID and a password. In this case, too, the user performs sign-on to the account aggregation server 3 ("a8" in FIG. 2), downloading the password bank password registered ("a9" in FIG. 2). The PC 1 uses the password bank password, thus downloaded, encrypting the user ID and password for the server (n) 2. The user ID and the password, thus encrypted, are registered in the ID/password database 13. When the user ID and the password, used for the encryption are registered in the ID/password database 13, the downloaded password bank password is immediately erased from the PC 1 ("a10" in FIG. 2). Thereafter, every time the user registers himself or herself in any server 2 to order to receive new service, this sequence is repeated in the account aggregation system.

The user IDs and passwords are registered in the ID/password database 13, by means of the automatic sign-on process module 11. In the automatic sign-on process module 11, the ID/password database key process module 111 downloads, whenever necessary, the password bank password from the account aggregation server 3 so that the user ID and password may be encrypted. When the user ID and password are encrypted, the password bank password is deleted from the PC 1. The password bank password temporarily therefore remains in the PC 1, for a short time when it is required. Hence, should a suspicious person snatch the PC 1 away thereafter, the user ID and password managed in the ID/password database 13 will not be decrypted at all. Since the password bank password exchanged between the PC 1 and the account aggregation server 3 remains decrypted, the security of the user ID and password is ensured.

Figure 3:
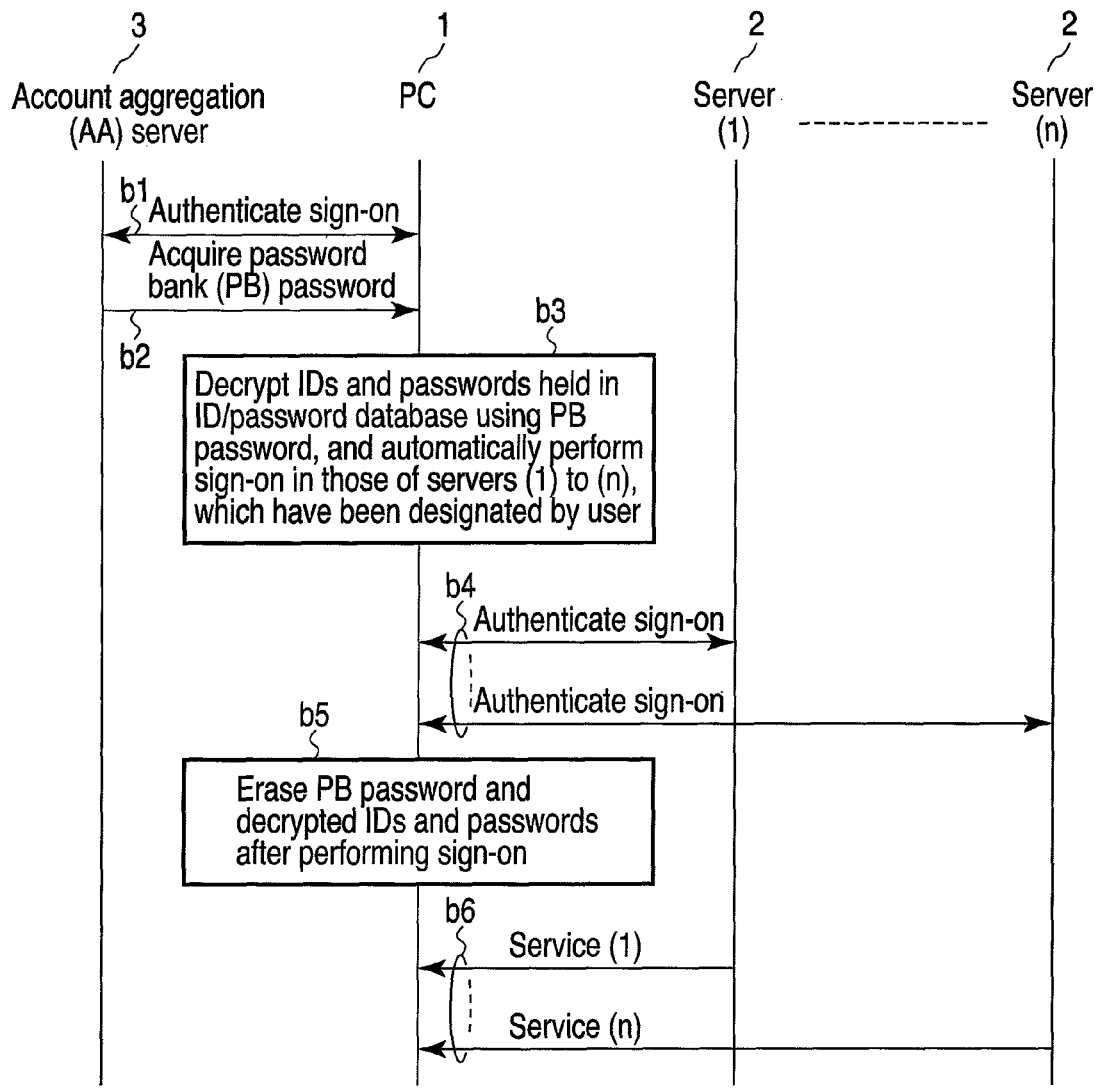
FIG. 3 is an exemplary diagram illustrating the communication sequence performed while the account aggregation system according to the embodiment is using a single-sign on scheme.

FIG. 3 is an exemplary diagram illustrating the communication sequence performed while the account aggregation system is using a single-sign on scheme.

When the user makes sign-on to the account aggregation server 3 ("b1" in FIG. 3), the password bank password is downloaded to the PC 1 ("b2" in FIG. 3). Then, the PC 1 uses the password bank password thus downloaded, decrypting the user ID and password registered in the ID/password database 13 and performing the sign-on to the servers 2 designated by the user (e.g., server (1) 2 and server (n) 2) ("b3" in FIG. 3).

An authentication process is thereby performed between the account aggregation server 3 and the servers 2 designated by the user ("b4" in FIG. 3). At the time the servers 2 are authenticated, the PC 1 immediately erases the user ID and password and the password bank password downloaded ("b5" in FIG. 3).

Then, the user operates the PC 1, thus signed-on to the servers 2, thereby receiving the desired service from the servers 2 ("b6" in FIG. 3).

In the PC 1, the automatic sign-on process module 11 accomplishes the sign-on to the servers 2, by using the user ID and password registered in the ID/password database 13. The ID/password database key process module 111 of the automatic sign-on process module 11 downloads the password bank password for encrypting the user ID and password from the account aggregation server 3, every time the password bank password is needed. Once the password bank password has been used, the ID/password database key process module 111 deletes the password bank password from the PC 1 (together with the user ID and the password, both having been decrypted.) Therefore, the password bank password exists (along with the user ID and password in decrypted form) in the PC 1, only while it remains necessary. Even if suspicious person snatches the PC 1 away thereafter, the user ID and password registered in the ID/password database 13 will not be decrypted or leaked. Since the password bank password exchanged between the PC 1 and the account aggregation server 3 remains decrypted, the security of the user ID and password is ensured.

FIG. 4 is an exemplary diagram illustrating the communication sequence performed when the password bank password is updated in the account aggregation system.

When the user makes sign-on to the account aggregation server 3 ("c1" in FIG. 4), updating the password bank password on the setting menu screen of the account aggregation server 3, the password bank password is downloaded to the PC 1 ("c2" in FIG. 4). Then, the PC 1 first uses the password bank password, thereby decrypting the user ID and password registered in the ID/password database 13 ("c3" in FIG. 4).

Next, the PC 1 receives a new password bank password the user has input ("c4" in FIG. 4). The new password bank password (i.e., updated password bank password) is registered in the account aggregation server 3 ("c5" in FIG. 4). The PC 1 then uses the new password bank password, again encrypting the user ID and password, both in decrypted form. The user ID and password, thus encrypted, are registered in the ID/password database 13. At the time the user ID and password thus encrypted are registered in the ID/password database 13, the password bank password input and updated is immediately erased from the PC 1 ("c6" in FIG. 4).

In the PC 1, the automatic sign-on process module 11 updates the password bank password. That is, the ID/password database key process module 111 of the automatic sign-on process module 11 downloads, from the account aggregation server 3, the password bank password so that the password bank password may be updated. Once the password bank password has been used, the ID/password database key process module 111 deletes the password bank password from the PC 1. The password bank password updated is also deleted from the PC 1, immediately after the user ID and password have been encrypted again. As a result, not only the password bank password not updated yet, but also the password bank password updated exists in the PC 1, only while they remain necessary. Even if a suspicious person snatches the PC 1 away thereafter, the user ID and password registered in the ID/password database 13 will never be decrypted or leaked. Further, since the password bank password (either not updated or updated) exchanged between the PC 1 and the account aggregation server 3 remains decrypted, the security of the user ID and password is ensured.

The processes using the password bank password are thus performed in the communication sequence shown in FIG. 2, FIG. 3 and FIG. 4. The security of the user ID and password is ensured, when the account aggregation system is initialized, when the system uses a single-sign on scheme, and when the password bank password is updated.

The encryption key (i.e., password bank password) is acquired by the PC 1, whenever necessary, from the account aggregation server 3, is managed in the account aggregation server 3, and is immediately deleted from the PC 1 once it has been used. Both the user ID and the user password are managed in the PC 1, never in external servers when account aggregation is performed. Hence, should the PC 1 be snatched away, the user ID and the user password would not leak.

As has been described, the user ID and password used to achieve a log-in to any server can be reliably prevented from leaking, in the account aggregation system according to this embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An account aggregation system for assisting an entry of authentication data while requesting service from service providing servers, the system comprising:
   an information processing apparatus configured to receive service from the service providing servers, each having requested the authentication data; and
   an account aggregation server configured to execute encrypted communication with the information processing apparatus,
   wherein the information processing apparatus comprises:
   a database configured to store the authentication data;
   an automatic sign-on process module configured to provide the authentication data requested by the service providing servers from the database; and
   an encryption key processing module configured to register, for the account aggregation server, an encryption key for encrypting authentication data to be stored in the database or for decrypting the authentication data stored in the database, to acquire the encryption key from the account aggregation server when a process is executed using the encryption key, and to erase the encryption key after the process is executed,
   the account aggregation server comprises an encryption key management module configured to manage the encryption key;
   the encryption key processing module comprises an encryption key updating module configured to update the encryption key managed by the account aggregation server, and
   the encryption key updating module is configured to acquire the encryption key not updated yet from the account aggregation server in order to decrypt the authentication data stored in the database, to erase the encryption key not updated yet after decrypting the authentication data, to encrypt the authentication data by using updated encryption key in order to store the authentication data in the database, and to erase the updated encryption key after storing the authentication data.

2. The system of claim 1, wherein the authentication data comprises identification data for identifying a user and password data for confirming identification of the user.

3. The system of claim 1, wherein the account aggregation server further comprises an authentication module configured to authenticate the user of the information processing apparatus.

4. An information processing apparatus configured to receive service from service providing servers requesting authentication data in an account aggregation system for assisting the inputting of the authentication data in order to receive service from the service providing servers by cooperating with an account aggregation server executing encrypted communication with the information processing apparatus, the apparatus comprising:
   a database configured to store the authentication data;
   an automatic sign-on process module configured to provide the authentication data requested by the service providing servers from the database; and
   an encryption key processing module configured to register, for the account aggregation server, an encryption key for encrypting authentication data to be stored in the database or for decrypting the authentication data stored in the database, to acquire the encryption key from the account aggregation server when a process is executed using the encryption key, and to erase the encryption key after the process is executed, wherein:
   the encryption key processing module comprises an encryption key updating module configured to update the encryption key registered in the account aggregation server, and
   the encryption key processing module is configured to acquire the encryption key not updated yet from the account aggregation server in order to decrypt the authentication data stored in the database, to erase the encryption key not updated yet after decrypting the authentication data, to encrypt the authentication data by using updated encryption key in order to store the authentication data in the database, and to erase the updated encryption key after storing the authentication data.

5. The apparatus of claim 4, wherein the authentication data comprises identification data for identifying a user and password data for confirming identification of the user.

6. An encryption key management method of an account aggregation system for assisting the inputting of authentication data in order to receive service from service providing servers, the system comprising an information processing apparatus which comprises a storage device and is configured to receive service from service providing servers requesting authentication data, and an account aggregation server configured to execute encrypted communication with the information processing apparatus, the method comprising:
   storing authentication data in the storage device;
   providing authentication data requested by the service providing servers from the storage device;
   registering, for the account aggregation server, an encryption key for encrypting authentication data to be stored in the storage device or decrypting the authentication data stored in the storage device, acquiring the encryption key from the account aggregation server when a process is executed using the encryption key, and erasing the encryption key after the process is executed; and
   managing the encryption key, by the account aggregation server, wherein
   the registering the encryption key comprises updating the encryption key managed by the account aggregation server, and
   the updating the encryption key comprises acquiring the encryption key not updated yet from the account aggregation server in order to decrypt the authentication data stored in the database, erasing the encryption key not updated yet after decrypting the authentication data, encrypting the authentication data by using updated encryption key in order to store the authentication data in the database, and erasing the updated encryption key after storing the authentication data.

* * * * *